(12) United States Patent
Gosselin

(10) Patent No.: US 6,860,407 B2
(45) Date of Patent: Mar. 1, 2005

(54) SYSTEM AND POUCH FOR DISPENSING SYRUPS, TOPPINGS, AND OTHER PRODUCTS

(75) Inventor: Francois Gosselin, Taylors, SC (US)

(73) Assignee: Cryovac, Inc., Duncan, SC (US)

(*) Notice: Subject to any disclaimer, the term of this patent is extended or adjusted under 35 U.S.C. 154(b) by 0 days.

(21) Appl. No.: 10/429,371

(22) Filed: May 5, 2003

(65) Prior Publication Data

US 2004/0222233 A1 Nov. 11, 2004

(51) Int. Cl.[7] ............................................. B65D 35/00
(52) U.S. Cl. ............................ 222/105; 222/1; 222/95; 222/107
(58) Field of Search .................... 222/1, 92–96, 222/105, 107; 383/906

(56) References Cited

U.S. PATENT DOCUMENTS

| | | | |
|---|---|---|---|
| 4,322,018 A | 3/1982 | Rutter | 222/83 |
| 4,356,937 A | 11/1982 | Simon et al. | 222/129.2 |
| 4,603,793 A | 8/1986 | Stern | 222/105 |
| 4,776,488 A | 10/1988 | Gurzan | 222/81 |
| 4,960,227 A | * 10/1990 | Coleman | 222/94 |
| 5,178,303 A | 1/1993 | Blenkush et al. | 222/153 |
| 5,421,485 A | 6/1995 | Furuta et al. | 222/95 |
| 5,467,581 A | 11/1995 | Everette | 53/133.2 |
| 5,480,057 A | 1/1996 | Papaluca | 220/403 |
| 5,730,327 A | 3/1998 | Stern | 222/82 |
| 5,791,519 A | 8/1998 | Van Marcke | 222/82 |
| 5,915,596 A | * 6/1999 | Credle, Jr. | 222/105 |
| 6,082,584 A | 7/2000 | Stern | 222/83 |
| 6,089,406 A | 7/2000 | Feldner | 222/103 |
| 6,098,845 A | 8/2000 | Stern | 222/83 |
| 6,189,736 B1 | 2/2001 | Phallen et al. | 222/52 |
| 6,227,410 B1 | 5/2001 | Stern | 222/1 |
| 6,294,761 B1 | * 9/2001 | Diederich et al. | 219/386 |
| 6,419,121 B1 | 7/2002 | Gutierrez et al. | 222/146.5 |
| 6,419,393 B1 | 7/2002 | Shibata | 383/202 |
| 6,467,652 B2 | * 10/2002 | Wilcox et al. | 222/95 |
| 2002/0179642 A1 | 12/2002 | Gutierrez et al. | 222/146.1 |
| 2003/0106902 A1 | * 6/2003 | Bolam | 222/92 |

* cited by examiner

*Primary Examiner*—J. Casimer Jacyna
(74) *Attorney, Agent, or Firm*—Mark B. Quatt

(57) ABSTRACT

A system for dispensing a pumpable product comprises a product well; a pouch disposed in a substantially U-shaped arrangement in the product well, the pouch comprising a first wall and a second wall, and a fitment disposed on the first wall of the pouch, wherein the pouch contains the pumpable product; and a pump device in connected relationship with the fitment of the pouch. A method for dispensing a pumpable product, and a pouch, are also disclosed.

20 Claims, 6 Drawing Sheets

SYSTEM AND POUCH FOR DISPENSING SYRUPS, TOPPINGS, AND OTHER PRODUCTS

FIELD OF THE INVENTION

This invention relates to a system and pouch suitable for dispensing syrups, toppings, condiments and other products. The pouch is preferably of the type made in a vertical form/fill/seal process.

BACKGROUND OF THE INVENTION

Vertical form/fill/seal (VFFS) packaging systems have proven to be very useful in packaging a wide variety of food and non-food pumpable and/or flowable products. An example of such systems is the Onpack™ flowable food packaging system marketed by Cryovac/Sealed Air Corporation. The VFFS process is known to those of skill in the art, and described for example in U.S. Pat. No. 4,589,247 (Tsuruta et al), U.S. Pat. No. 4,656,818 (Shimoyama et al.), U.S. Pat. No. 4,768,411 (Su), and U.S. Pat. No. 4,808,010 (Vogan) all incorporated herein by reference in their entirety. In such a process, lay-flat thermoplastic film is advanced over a forming device to form a tube, a longitudinal (vertical) fin or lap seal is made, and a bottom end seal is made by transversely sealing across the tube with heated seal bars. A flowable product is introduced through a central, vertical fill tube to the formed tubular film. The pouch is then completed by sealing the upper end of the tubular segment, and severing the pouch from the tubular film above it. The process can be a two-stage process where the creation of a transverse heat seal occurs at one stage in the process, and then, downstream of the first stage, a separate pair of cooling/clamping means contact the just-formed transverse heat seal to cool and thus strengthen the seal. In some VFFS processes, an upper transverse seal of a first pouch, and the lower transverse seal of a following pouch, are made, and the pouches cut and thereby separated between two portions of the transverse seals, without the need for a separate step to clamp, cool, clamp, cool, and cut the seals. A commercial example of an apparatus embodying this more simplified process is the Onpack™ 2050A VFFS packaging machine marketed by Cryovac/Sealed Air Corporation.

U.S. Pat. No. 4,603,793 (Stern), incorporated herein by reference in its entirety, discloses a coupling means 6a which is mounted on the inside wall of a pouch. Such coupling means, or fitment, offer several advantages in packaging food products, such as the capability of connecting the fitment to a pumping device. This permits the contents of the package to be dispensed in a controllable way. The particular coupling device described in U.S. Pat. No. 4,603,793 is mounted inside the pouch. This arrangement avoids the disadvantages associated with externally mounted fitments. These include the difficulty of properly packing multiple pouch units, and the possibility that an external fitment will be damaged during handling/storage. If this happens, the food or other pouch contents can possibly leak out. Packaging systems combining the Onpack (™) system with the fitment technology of U.S. Pat. No. 4,603, 793 have proven effective in providing a pouch making system where the pouch, containing a food product, includes an internal fitment. The internal fitment is typically near one end of the pouch (see e.g. FIG. 1 of the '793 patent) to ensure that the contents of the pouch are directed, e.g. by gravity, toward and pumped from and through the internal fitment by a suitable pump dispensing system.

One preferred method and apparatus for installing internal fitments of the type disclosed by Stern, is disclosed in U.S. Pat. No. 5,467,581 (Everette), incorporated herein by reference in its entirety.

In contrast, in the food service industry, including retail fast food restaurants and the like, syrups and toppings are typically dispensed from relatively small stainless steel or plastic product wells. These wells are typically manually filled by store employees. These wells are usually in one of two arrangements. In the first arrangement, the well is manually filled with a food product, such as flavored toppings, sauces, liquid condiments of various viscosities (ketchup, mustard, mayonnaise, etc.), and the like. The employee spoons out a more or less appropriate amount of the food product as needed. This arrangement can sometimes be accessed directly by the restaurant customer.

An alternative arrangement is to include a cover, typically made of stainless steel, having a portion control pump fitted therein. Such systems are available from Server, Perfection, and other food service equipment suppliers. After manual filling of a well, a cover carrying or accommodating a pump is dropped onto the top of the well. The pump is conventional in nature for this application, and those skilled in the art will be familiar with the various makes and models of pumps and their operation, so that further details are not provided herein. After filling the product well and installing the cover and pump, the pump can be activated as needed, e.g. manually, to dispense a preferably controlled portion of the syrup, topping, or other product from the well, through the pump, and onto a plate, food product, etc.

This system for dispensing syrups, toppings, and the like suffers from several problems.

First, these product wells tend to be small in volume, typically about 0.5 gallons, so that they require frequent refilling in high-use environments.

Second, in conventional systems the refilling is accomplished by pouring product from rigid or semirigid containers such as cans or jugs. When an employee of the restaurant, particularly an inexperienced one, is attempting a refill, the process can be a messy one as product misses the well, overflows past the top of the well, etc.

A third problem associated with conventional systems is the need to periodically clean the well. When very viscous and/or high sugar content products are being used, properly cleaning the well can be a labor intensive, time consuming, and difficult task.

Finally, product freshness becomes an issue when the product is disposed in the well for an extended period of time. This is aggravated by conditions where the product is dispensed at relatively high temperatures, where evaporation through long exposure to high temperatures significantly and adversely affects the quality of the product.

The inventor has found that these problems of the prior art can be solved by a system that utilizes a pouch with a fitment, preferably an internal fitment, that is preferably substantially centrally (geometrically) located on an external or internal surface of the pouch. Such a pouch can be interfaced with a conventional portion control pump or other suitable pumping system, and inserted in a U-shaped arrangement or substantially U-shaped arrangement in a product well. A well of e.g. 0.5 gallons can thus accommodate a pouch of about 0.5 gallons, while ensuring excellent evacuation rates (compared with conventional product pumping systems as described above). Tests with water as the product have demonstrated that the pouch essentially completely collapses around the fitment as the pouch is evacuated by activating the portion control pump.

An advantage of the invention is that no manual refilling of the product is necessary. When an installed pouch is empty, the emptied pouch is simply removed form the well, and disengaged from the pump, and a full pouch is installed by inserting a piercing nozzle, connected to or to be connected to a pump device, into the area of the pouch defined by the fitment, folding the connected pouch in a generally U-shape, and pushing the pouch down into the product well.

The labor intensive cleaning of the well is substantially eliminated because the pouch material shields the internal surface of the well from direct content with the food product.

Finally, optimal product freshness is promoted by maintaining the product in an enclosed pouch throughout its useful life. Food pouches are often made from high oxygen barrier materials, and offer extended shelf life for food products contained in the pouch.

SUMMARY OF THE INVENTION

In a first aspect, a system for dispensing a pumpable product comprises a product well; a pouch disposed in a substantially U-shaped arrangement in the product well, the pouch comprising a first wall and a second wall, and a fitment disposed on the first wall of the pouch, wherein the pouch contains the pumpable product; and a pump device in connected relationship with the fitment of the pouch.

In a second aspect, a method for dispensing a pumpable product comprises providing a pouch comprising a first wall and a second wall, and a fitment disposed on the first wall of the pouch, wherein the pouch contains the pumpable product; connecting the fitment of the pouch to a pump device; placing the pouch in a product well such that the pouch forms a substantially U-shaped arrangement in the product well; and activating the pump device to dispense the pumpable product from the pouch.

In a third aspect, a method for dispensing a pumpable product comprises providing a pouch comprising a first wall and a second wall, and a fitment disposed on the first wall of the pouch, wherein the pouch contains the pumpable product; placing the pouch in a product well such that the pouch forms a substantially U-shaped arrangement in the product well; connecting the fitment of the pouch to a pump device; and activating the pump device to dispense the pumpable product from the pouch.

In a fourth aspect, a thermoplastic pouch comprises a first longitudinal edge, a second longitudinal edge, a first side edge, a second side edge, a first wall, a second wall, and a fitment disposed on the first wall of the pouch, the fitment substantially centrally disposed between the first and second longitudinal edges of the pouch.

BRIEF DESCRIPTION OF THE DRAWINGS

The present invention is illustrated by reference to the following drawings, encompassing different views of various embodiments of the invention, wherein.

DETAILED DESCRIPTION OF THE INVENTION

Figure 1:
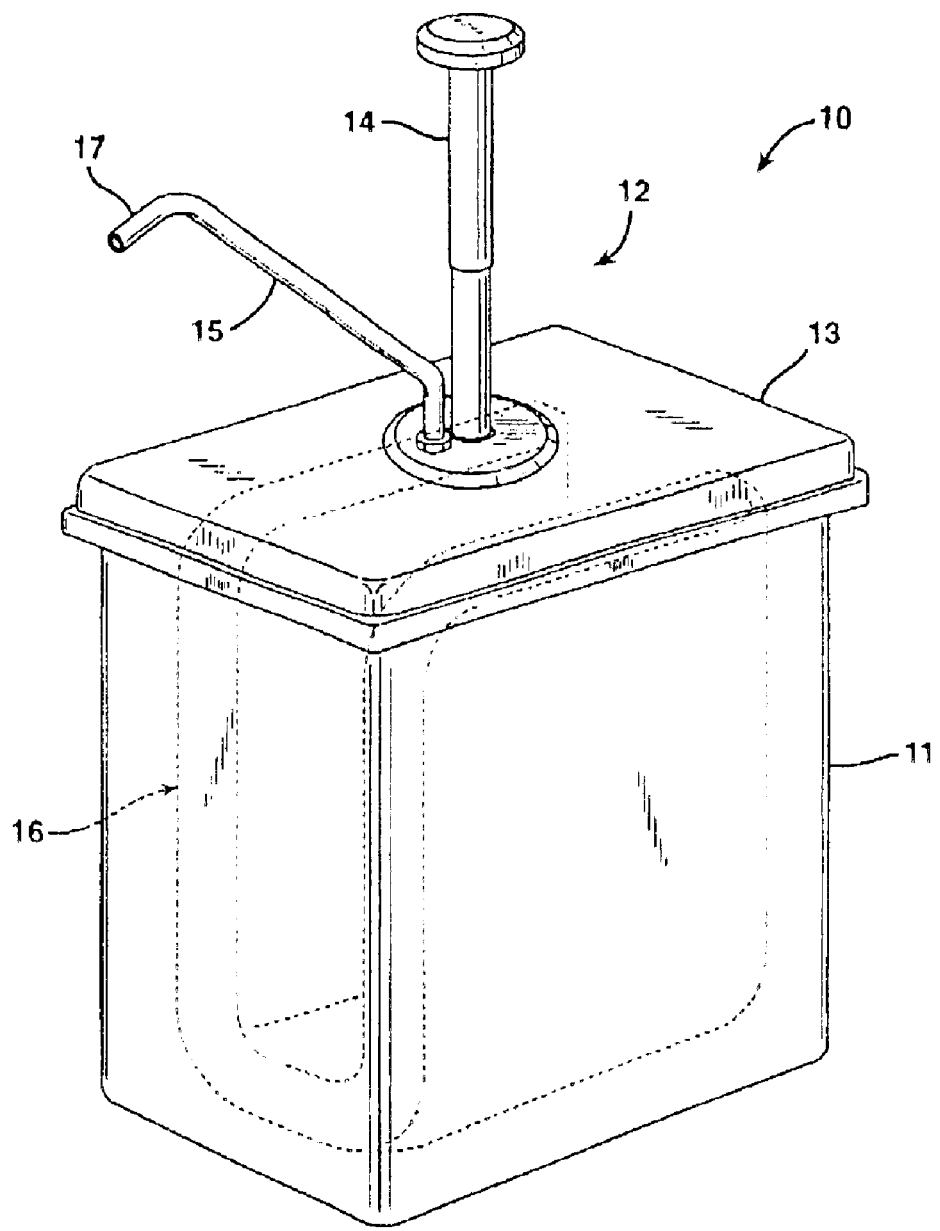
FIG. 1 is a perspective view of a system for dispensing a pumpable product.

FIG. 1 shows in perspective view a system for dispensing a pumpable product 10, including a product well 11, a pump device 12, and a pouch 16. The pump device 12 includes a cover 13, a piston 14, and a discharge tube 15 terminating in a dispensing nozzle 17. The pouch 16 is arranged substantially in a U-shape in the product well 11.

The product well can be made from any suitable material or combination of materials, including by way of example steel, aluminum, or plastic. The exact shape and geometry of the product well can vary, as long as it can accommodate a substantially U-shaped pouch.

The pump device 12 can be made from any suitable material or combination of materials, including by way of example steel, aluminum, or plastic. The pump device 12 and the components thereof can be of any suitable design, as long as the pump device can, when connected to a pouch, dispense product from the interior of a substantially U-shaped pouch disposed in the product well.

The pouch can be made from any suitable material, and is preferably made from a thermoplastic material, more preferably polymeric in composition, with a thickness of preferably between 0.1 and 100 mils. Preferred material comprises olefin or amide polymers or copolymers.

Figure 2:
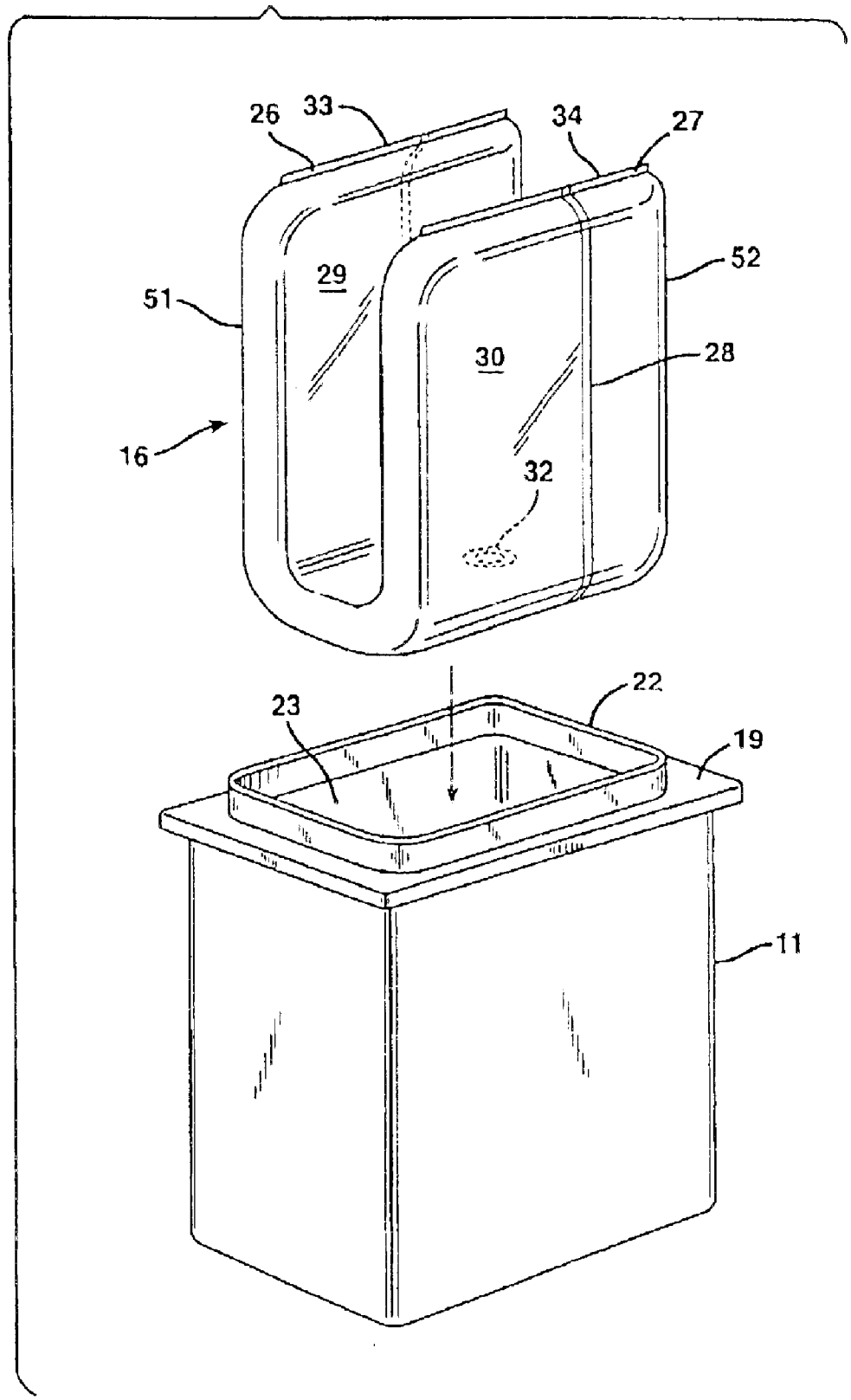
FIG. 2 is a perspective view of a U-shaped pouch and associated product well.

FIG. 2 is a perspective view of the U-shaped pouch and associated product well in accordance with the present invention. Product well 11 comprises a top portion 19 positioned generally around the top perimeter of the well, as well as a raised flange 22 disposed on the top portion 19, but somewhat inboard of the upper lateral perimeter of the product well. The raised flange 22, which along with top portion 19 is preferably an integral component of the product well, serves to help seat the cover 13 installed on the well, as part of the pump device, after the well is filled. The product well defines a cavity 23 in which the substantially U-shaped pouch containing a pumpable product, either food or non food, can be disposed for use.

Pouch 16 is a pouch containing a pumpable product. The pouch 16 includes a first transverse seal 26, a second transverse seal 27, and a longitudinal seal 28. The pouch includes a first wall 29 having an outer surface and an inner surface, and a second wall 30 having an outer surface and an inner surface. The pouch 16 also includes a first side edge 51 and a second side edge 52, and a first longitudinal edge 33 and a second longitudinal edge 34. A fitment 32 is attached to the pouch, more preferably to the inner surface of the first wall 29, preferably in a manner described in U.S. Pat. No. 4,603,793 (Stern), but in the case of the present invention substantially centrally disposed between the first and second longitudinal edges of the pouch. These respective edges are depicted as 33 and 34 in FIG. 2, and are defined by the outer longitudinal extremities of first transverse seal 26 and second transverse seal 27 respectively. In some embodiments, some unsealed pouch material can be present between the outer longitudinal edges of a transverse seal, and the actual respective longitudinal edges of the pouch itself. Such embodiments are also contemplated within the scope of the present invention.

In lieu of an internal fitment as shown, any other suitable internal fitment can be used. Alternatively, any suitable external fitment, adhered by any suitable means to the outer surface of first wall 29, can be used with benefit in connection with the present invention. An external fitment can be applied to the outer surface of first wall 29 at a central location on the pouch surface, such that the fitment is substantially centrally disposed between the first and second longitudinal edges of the pouch.

The downward pointing arrow of FIG. 2 indicates that in practice, the pouch 16 is folded in a substantially U-shaped arrangement, such that both legs of the U are of equal or substantially equal length, and such that the fitment 32 is disposed between the two legs of the U, and adapted to be connected to the drawing tube of a pump, discussed in further detail below. In its folded condition, the pouch can then be inserted into the product well as shown, and the U shaped arrangement maintained after the pouch has been placed in the product well.

Figure 3:
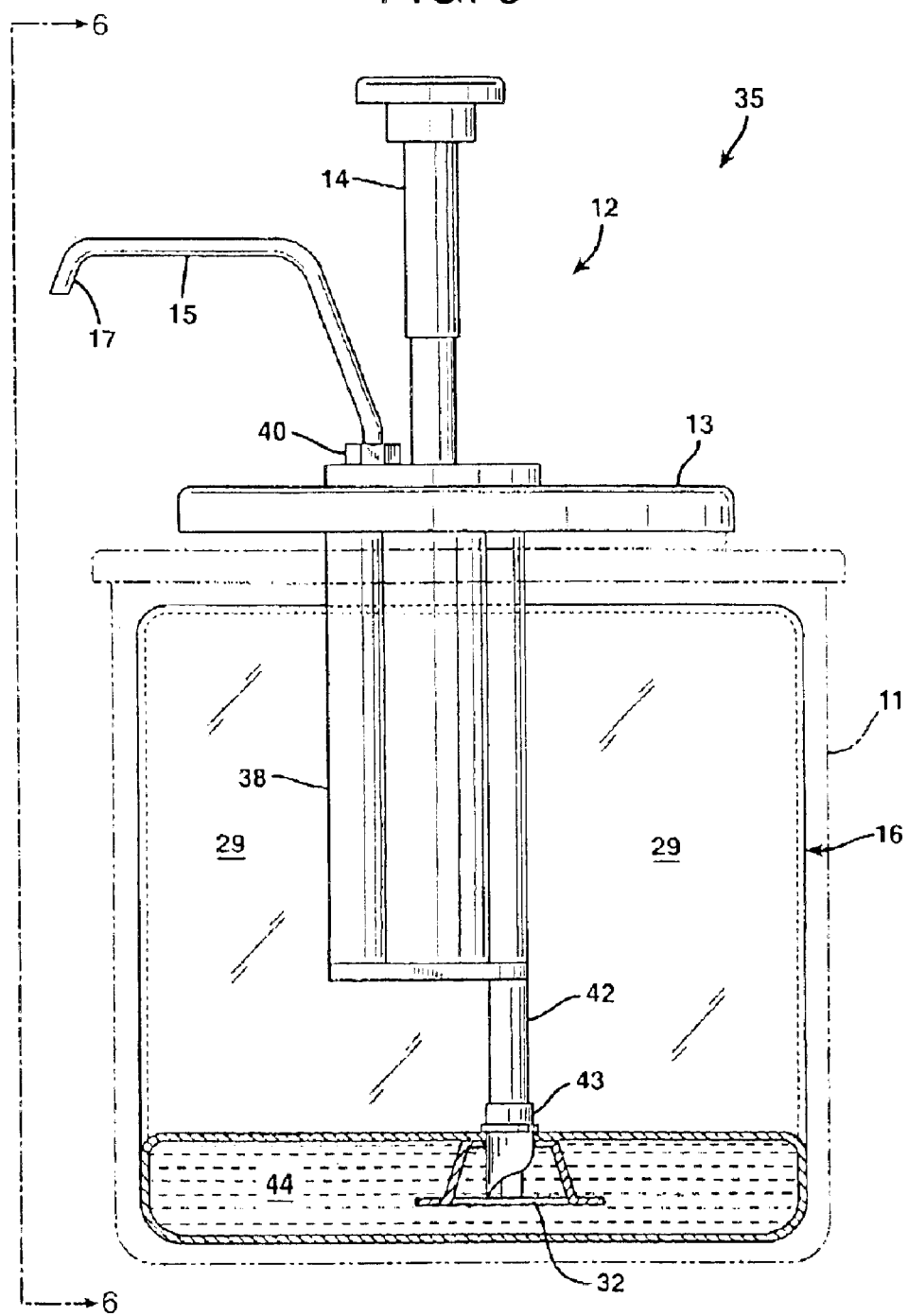
FIG. 3 is a side elevational partially cut away view of a system for dispensing a pumpable product.

FIG. 3 shows a side elevational partially cut away view of the system for dispensing a pumpable product. The system 35 includes the product well 11 and the pump device 12. In the drawing of FIG. 3, the filled pouch 16 has been disposed in a generally U-shaped arrangement in product well 11 (shown in phantom here so that other features of the invention can be more clearly shown) in the manner shown in FIG. 2 and described hereinabove.

The pump device 12 includes the cover 13, piston 14, and discharge tube 15 terminating in dispensing nozzle 17. The piston and discharge tube, along with the pump device body 38, are secured to the cover 13 by means of fastener 40. A drawing tube 42 on the lower portion of the pump device body, terminates in a piercing nozzle 43. In one embodiment, this piercing nozzle can be attached to a conventional drawing tube of a conventional pump device. Many alternative embodiments are possible, however, and any are suitable provided that a fitment 32 disposed on an internal or external surface of the pouch can be brought via piercing nozzle 43 into communication with a pump device. A contained product 44, such as a beverage, powder, syrup, topping, or other pumpable product, can thus be dispensed, upon activation of the pumping device by any suitable means such as mechanical or electromechanical means, through fitment 32, through piercing nozzle 43, up through drawing tube 42, up through pump device body 38, to discharge tube 15 and out through dispensing nozzle 17.

Piercing nozzle 43 can be e.g. of the general type disclosed in the Stern patent (U.S. Pat. No. 4,603,793), referred to above, but can of any suitable configuration and geometry. The preferred device shown has an advantage that the walls of the pouch will not totally collapse together in the area of the fitment, due to the geometry of the fitment. This arrangement assures nearly complete emptying of the pouch.

The system as shown in FIG. 3 illustrates one of the walls of the pouch, namely first wall 29. This is one of the two major walls of a filled pouch, the other being second wall 30 (see also FIG. 2).

Figure 4:
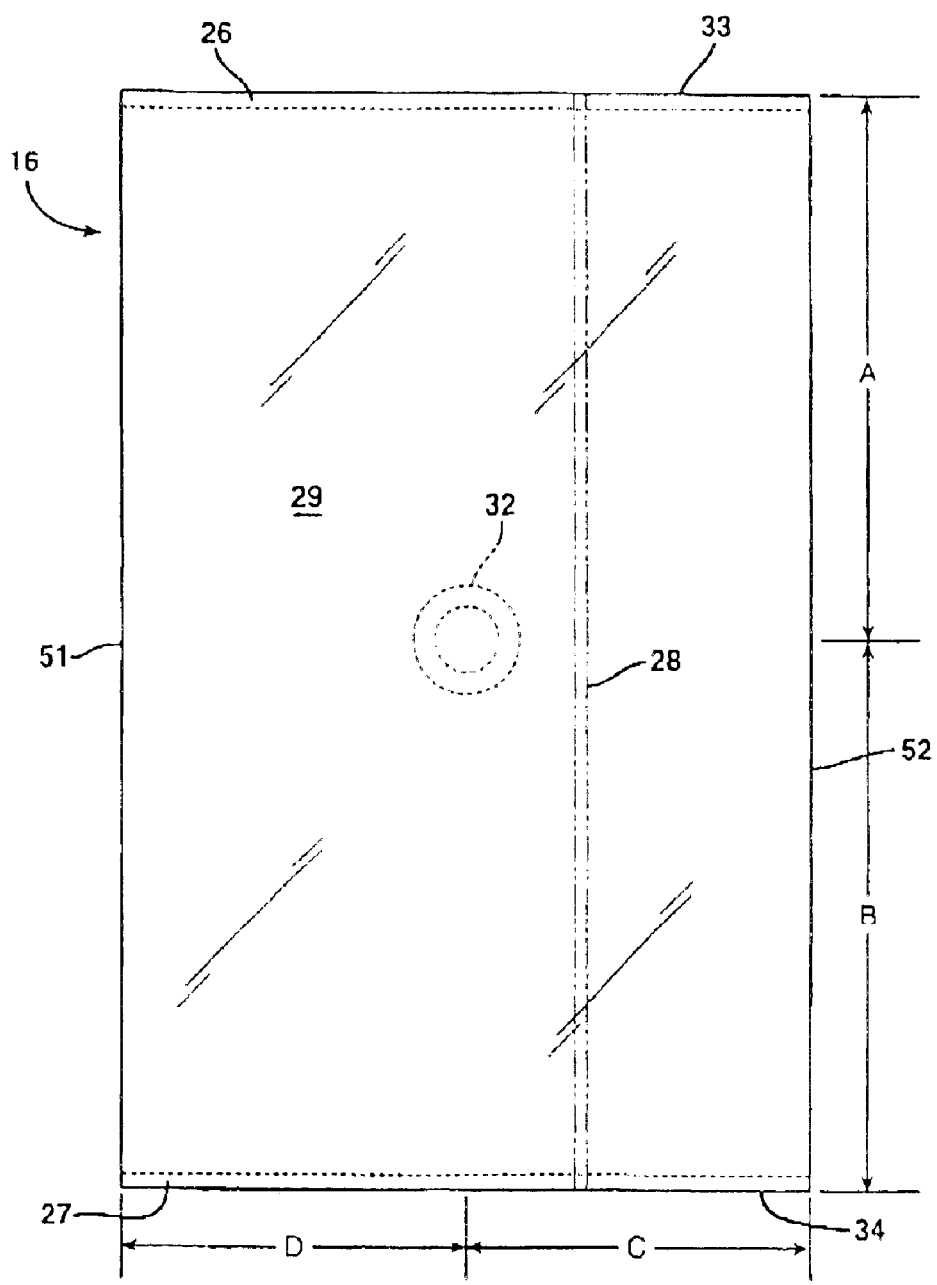
FIG. 4 is a schematic top plan view of a pouch in its sealed and filled condition, having a substantially centrally located fitment.
Figure 5:
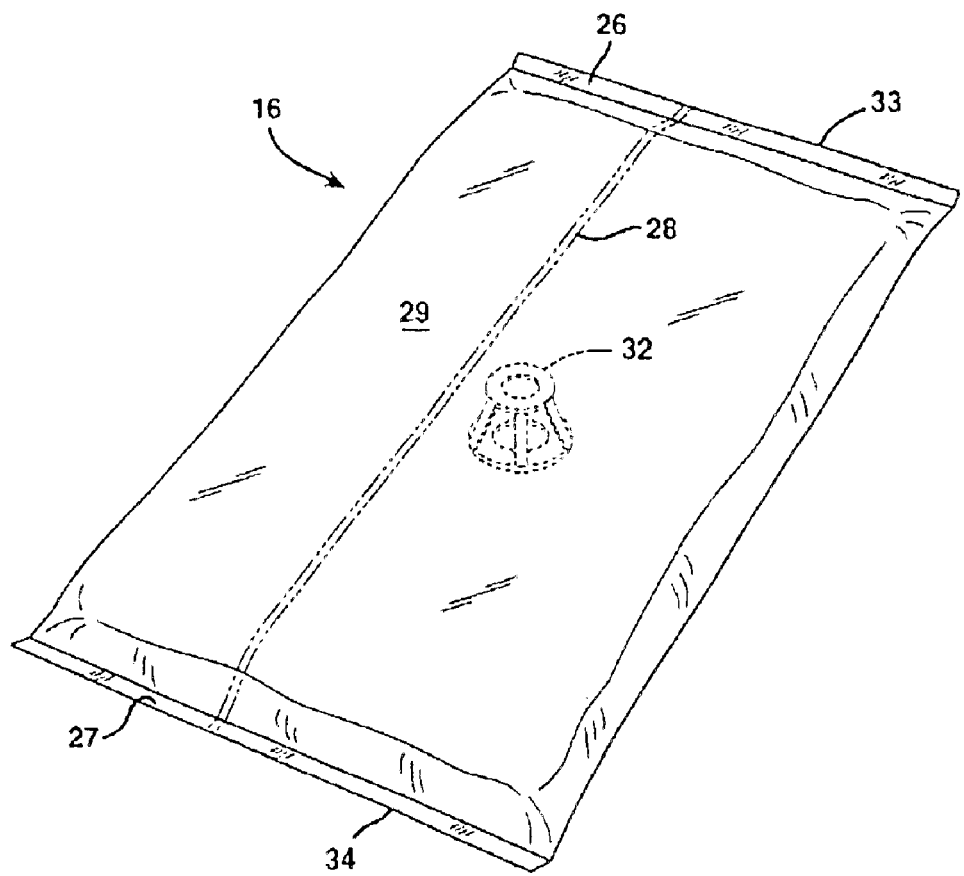
FIG. 5 a perspective view of the pouch of FIG. 4.

In FIGS. 4 and 5, the pouch 16 is shown in plan and perspective views respectively. The pouch 16 includes a first transverse seal 26, a second transverse seal 27, and a longitudinal seal 28. The pouch includes a first wall 29 having an outer surface and an inner surface, and a second wall 30 having an outer surface and an inner surface. A fitment 32 is attached to the inner surface of the first wall 29, in a manner described in U.S. Pat. No. 4,603,793 (Stern), but in the case of the present invention substantially centrally disposed between the first and second longitudinal ends of the pouch. These respective ends 33 and 34 are defined by the outer longitudinal extremities of first transverse seal 26 and second transverse seal 27 respectively. In some embodiments, some unsealed pouch material can be present between the outer longitudinal edges of a transverse seal, and the actual respective longitudinal edge of the pouch itself. Such embodiments are also contemplated within the scope of the present invention.

"Substantially centrally located" and the like herein refers to the location of the fitment (more specifically the center of the fitment as seen looking down on the pouch as in FIG. 4) with respect to the midpoint between edges 33 and 34. The exact longitudinal center of the pouch is preferred as the location for the fitment, as this will insure that the pouch when folded in a U-shape will have symmetry, i.e. the two "legs" of the folded pouch 51 and 52 (see FIGS. 2 and 6) will be of the same or substantially the same length when the fitment is centered in the product well.

As represented in FIG. 4, the fitment 32 is disposed halfway between first longitudinal edge 33 and second longitudinal edge 34, such that the distance "A" is the same as the distance "B".

Alternatively, fitment 32 could be somewhat offcenter, i.e. distance "A" could be less than or greater than distance "B". The difference in distance between "A" and "B" is preferably less than or equal to 30%, more preferably less than or equal to 20%, and most preferably less than or equal to 10%.

Thus, if "A" is 10 centimeters long, "B" is preferably 10 centimeters long as well. However, "A" could be 11 centimeters long, while "B" is 9 centimeters long. This would be a difference in length, between "A" and "B", of about 22%. The practical limits are those imposed by the product well, and the fact that the more unequal the length of the two legs of the U-shaped pouch, the more difficult it is to properly align the fitment inside the product well, and to accommodate any cover on the product well.

It should also be noted that the width of the pouch 16, represented by lengths "C" plus "D", is such that preferably the distance "C" is equal to or nearly equal to distance "D". Thus, the fitment is preferably centered not only with respect to the longitudinal length of the pouch, represented by distances "A" plus "B", but also with respect to the transverse width of the pouch, represented by distances "C" plus "D". It is less critical that the fitment is transversely centered on the pouch, since an off centered fitment with respect to the width of the pouch simply means that the pump device, and specifically the piercing nozzle 43, will engage the fitment 32 further back in the product well (as exemplified in FIG. 3). Viewed as in FIG. 6, the fitment 32 would be further "into the drawing" than a totally (longitudinally and laterally) centered fitment.

Thus, as represented in FIG. 4, the fitment 32 is disposed halfway between first lateral edge 51 and second lateral edge 52, such that the distance "D" is the same as the distance "C".

Alternatively, fitment 32 could be somewhat offcenter laterally, i.e. distance "C" could be less than or greater than distance "D". The difference in distance between "C" and "D" is preferably less than or equal to 50%, more preferably less than or equal to 40%, and most preferably less than or equal to 30%, such as less than or equal to 20%, and less than or equal to 10%.

Thus, if "C" is 7.5 centimeters long, "D" is preferably 7.5 centimeters long as well. However, "C" could be 9 centimeters long, while "D" is 6 centimeters long. This would be a difference in length, between "C" and "D", of 50%. The practical limits are those imposed in part by the pump device used, since the drawing tube 42 extending down from the pump device can be situated at difference locations depending on the configuration of the pump device; and in part on the effectiveness of the fitment in allowing the flow of pumpable fluid from the two legs of the U-shaped pouch, through the fitment, and out through the pump device. As the position of the fitment is disposed, in various embodiments, toward the lateral "back" of the well, it can become more difficult to properly align the fitment vis-à-vis the pump device, and to properly draw the pumpable product toward the fitment during pumping.

Figure 6:
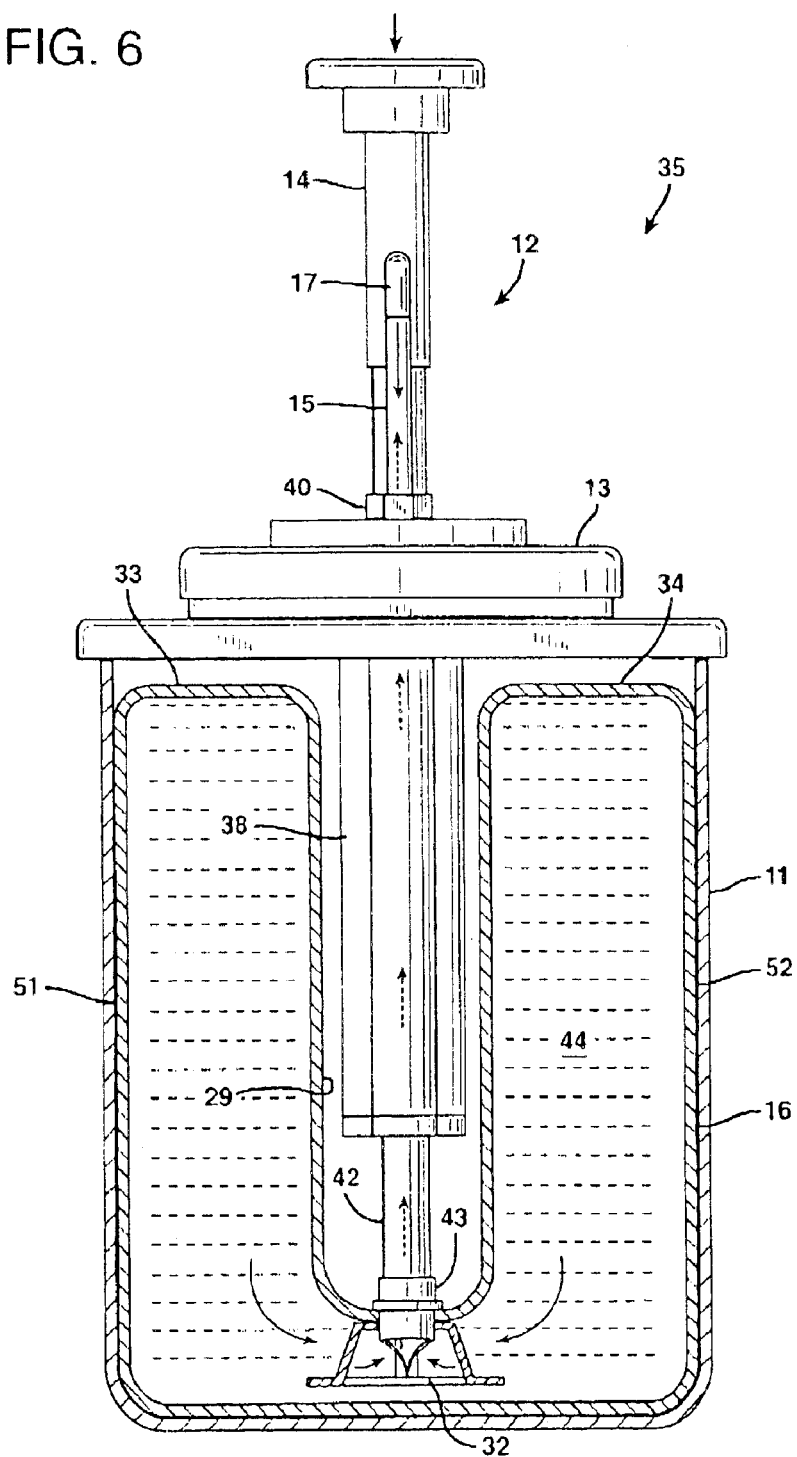
FIG. 6 is a front elevational view of the system of FIG. 3.

The pouch 16 is shown in FIG. 3 as being spaced apart from the interior surface of the product well 11. In FIG. 6 the pouch 16 is shown as being in contact with the interior surface of the product well 11. This distinction is intentional, first for the sake of clarity in FIG. 3 to distinguish the outline of the product well from the outline of the pouch, and secondly to demonstrate that as the pouch is inserted in U shape into the product well, some or all portions of the pouch can contact the interior surface of the product well 11, but some portions, because of folds and irregularities in the filled pouch, and the exact manner in which the pouch is placed in the product well, may not at all times be in contact with the product well.

It is also noted that the bottom of fitment 32 is shown in FIGS. 3 and 6 as spaced from the nearest part of the pouch wall. In use, the bottom (unsealed end) of the fitment may at certain times be so spaced, and at other times, depending on a variety of conditions such as the amount of pumpable product inside the pouch, and the exact manner in which the pouch is placed in the product well, may be in contact with the pouch wall. An advantage of the particular fitment disclosed in the drawings, is that the fitment ensures that pumpable product will be able to flow through the fitment, and out through the pump device during emptying of the pouch.

FIG. 6 shows a front elevational view of the system of FIG. 3, with the differences noted above. Thus, system 35 includes the product well 11 and the pump device 12. In the drawing of FIG. 6, the filled pouch 16 has been disposed in a generally U-shaped arrangement in product well 11 (shown in cross section here) in the manner shown in FIGS. 2 and 3 and described hereinabove.

The pump device 12 includes the cover 13, piston 14, and discharge tube 15 terminating in dispensing nozzle 17. The piston and discharge tube, along with the pump device body 38, are secured to the cover 13 by means of fastener 40. A drawing tube 42 on the lower portion of the pump device body, terminates in a piercing nozzle 43. In one embodiment, this piercing nozzle can be attached to a conventional drawing tube of a conventional pump device. Many alternative embodiments are possible, as described hereinabove.

Piercing nozzle 43 can be of any of the types described hereinabove.

Methodology

The invention can be carried out by either of two preferred methods.

The first method includes the steps of:
a) providing a pouch comprising:
  i) a first wall and a second wall; and
  ii) a fitment disposed on the first wall;
  wherein the pouch contains the pumpable product;
b) placing the pouch in a product well such that the pouch forms a substantially U-shaped arrangement in the product well;
c) connecting the fitment of the pouch to a pump device; and
d) activating the pump to dispense the pumpable product from the pouch.

The second method reverses steps b) and c), such that the fitment is connected to the pump device before the pouch is placed in the product well.

Those skilled in the art will understand, after a review of the present application, that the particular shape and size of the product well, and of the pump device, can be selected as needed to suit the particular size and shape of pouch that is to be made. Alternatively, especially with regard to existing commercial systems that include a product well and conventional pump system, the pouch size and shape, and location of the fitment on the pouch, as well as modifications to the pump system, can be selected to suit the existing product well and pump system.

The present invention can be used for dispensing pumpable products including low viscosity fluids (e.g. juice and non-carbonated beverages), high viscosity fluids (e.g. condiments and sauces), fluid/solid mixtures (e.g. soups), gels, etc. Non-food products such as fertilizers, motor oil and engine additives, wet cosmetics, medicaments, and the like can also be beneficially packaged in pouches of the present invention. The present invention finds particular utility in packaging pumpable food products at retail restaurant locations.

"Film" is used herein to mean films, laminates, and webs, either multilayer or monolayer, that may be used in connection with the present invention. The FS laminates, such as FS 7055, sold by Sealed Air Corporation through its Cryovac Division, are examples of packaging materials suitable for the VFFS process. These laminates are described in e.g. U.S. Pat. No. 4,746,562 (Fant), incorporated herein by reference in its entirety.

An alternative laminate is based on SCLAIR (™) sealant film, an ethylene/alpha-olefin copolymer marketed by DuPont Canada, and described in e.g. U.S. Pat. No. 4,521,437 (Storms), incorporated herein by reference in its entirety. A commercial monolayer film from DuPont Canada is FS-3. A commercial multilayer laminate is CL 303. Many other films and laminates useful for dry or wet fluid packaging are available, and can be beneficially used in the present invention.

"Pouch" herein includes a pouch, a bag, or like containers, either pre-made or made at the point of packaging.

"Filled" with respect to the pouch herein refers to a pouch that has been filled with a pumpable product in a manner consistent with a commercial filling operation. Thus, the pouch may or may not be 100% filled.

What is claimed is:

1. A system for dispensing a pumpable product comprising:
  a) a product well;
  b) a pouch disposed in a substantially U-shaped arrangement in the product well, the pouch comprising:
    i) a first wall and a second wall, a first longitudinal edge and a second longitudinal edge, a first side edge and a second side edge, and a longitudinal seal disposed between the first side edge and the second side edge, and extending from the first longitudinal edge to the second longitudinal edge; and
    ii) a fitment disposed on the first wall of the pouch; wherein the pouch contains the pumpable product; and
  c) a pump device in connected relationship with the fitment of the pouch.

2. The system of claim 1 wherein the fitment is disposed on the first wall of the pouch, halfway between the first and second longitudinal edges of the pouch.

3. The system of claim 1 wherein the fitment is disposed on the first wall of the pouch, such that the difference in the distance between the fitment and the first longitudinal edge, and the distance between the fitment and the second longitudinal edge, is less than or equal to 30%.

4. The system of claim 1 wherein the fitment is disposed on the first wall of the pouch, such that the difference in the distance between the fitment and the first longitudinal edge, and the distance between the fitment and the second longitudinal edge, is less than or equal to 20%.

5. The system of claim 1 wherein the fitment is disposed on the inner surface of the first wall of the pouch.

6. The system of claim 1 wherein the fitment is disposed on the first wall of the pouch, such that the difference in the distance between the fitment and the first side edge, and the distance between the fitment and the second side edge, is less than or equal to 50%.

7. A method for dispensing a pumpable product comprising:
   a) providing a pouch comprising:
      i) a first wall and a second wall; and
      ii) a fitment disposed on the first wall of the pouch; wherein the pouch contains the pumpable product;
   b) connecting the fitment of the pouch to a pump device;
   c) placing the pouch in U shape into a product well such that the pouch forms a substantially U-shaped arrangement in the product well; and
   d) activating the pump device to dispense the pumpable product from the pouch.

8. The method of claim 7 wherein the pouch comprises a first longitudinal edge and a second longitudinal edge, and the fitment is disposed on the first wall of the pouch, such that the difference in the distance between the fitment and the first longitudinal edge, and the distance between the fitment and the second longitudinal edge, is less than or equal to 30%.

9. The method of claim 7 wherein the fitment is disposed on an inner surface of the first wall of the pouch.

10. A method for dispensing a pumpable product comprising:
    a) providing a pouch comprising:
       i) a first wall and a second wall; and
       ii) a fitment disposed on the first wall of the pouch; wherein the pouch contains the pumpable product;
    b) placing the pouch in U shape into a product well such that the pouch forms a substantially U-shaped arrangement in the product well;
    c) connecting the fitment of the pouch to a pump device; and
    d) activating the pump to dispense the pumpable product from the pouch.

11. The method of claim 10 wherein the pouch comprises a first longitudinal edge and a second longitudinal edge, and the fitment is disposed on the first wall of the pouch, such that the difference in the distance between the fitment and the first longitudinal edge, and the distance between the fitment and the second longitudinal edge, is less than or equal to 30%.

12. The method of claim 10 wherein the fitment is disposed on an inner surface of the first wall of the pouch.

13. A thermoplastic pouch comprising:
    a) a first longitudinal edge;
    b) a second longitudinal edge;
    c) a first side edge;
    d) a second side edge;
    e) a first wall;
    f) a second wall;
    g) a fitment disposed on the first wall of the pouch, the fitment substantially centrally disposed between the first and second longitudinal edges of the pouch; and
    h) a longitudinal seal disposed between the first side edge and the second side edge, and extending from the first longitudinal edge to the second longitudinal edge.

14. The thermoplastic pouch of claim 13 wherein the fitment is disposed on the first wall of the pouch, halfway between the first and second longitudinal edges of the pouch.

15. The thermoplastic pouch of claim 13 wherein the fitment is disposed on the first wall of the pouch, such that the difference in the distance between the fitment and the first longitudinal edge, and the distance between the fitment and the second longitudinal edge, is less than or equal to 30%.

16. The thermoplastic pouch of claim 13 wherein the fitment is disposed on the first wall of the pouch, such that the difference in the distance between the fitment and the first longitudinal edge, and the distance between the fitment and the second longitudinal edge, is less than or equal to 20%.

17. The thermoplastic pouch of claim 13 wherein the first wall of the pouch comprises an inner surface and an outer surface, and the fitment is disposed on the inner surface of the first wall of the pouch.

18. The thermoplastic pouch of claim 13 wherein the fitment is substantially centrally disposed between the first and second side edges of the pouch.

19. The thermoplastic pouch of claim 13 wherein the fitment is disposed on the first wall of the pouch, halfway between the first and second side edges of the pouch.

20. The thermoplastic pouch of claim 13 wherein the fitment is disposed on the first wall of the pouch, such that the difference in the distance between the fitment and the first side edge, and the distance between the fitment and the second side edge, is less than or equal to 50%.

* * * * *